(12) United States Patent
Khlat et al.

(10) Patent No.: US 9,112,570 B2
(45) Date of Patent: Aug. 18, 2015

(54) FEMTOCELL TUNABLE RECEIVER FILTERING SYSTEM

(75) Inventors: Nadim Khlat, Cugnaux (FR); Marcus Granger-Jones, Scotts Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 1063 days.

(21) Appl. No.: 13/020,548

(22) Filed: Feb. 3, 2011

(65) Prior Publication Data

US 2012/0201172 A1   Aug. 9, 2012

(51) Int. Cl.
  *H04B 7/00*   (2006.01)
  *H04B 1/10*   (2006.01)

(52) U.S. Cl.
  CPC .................................. *H04B 1/1036* (2013.01)

(58) Field of Classification Search
  USPC ......... 370/276–281, 291, 328, 203, 204–215, 370/229–240, 310–337, 338–350, 351–395, 370/395.1, 395.3, 395.4, 395.41, 385.42, 370/395.5, 395.52, 431–457, 458–463, 370/464–497, 498–529
  See application file for complete search history.

(56) References Cited

U.S. PATENT DOCUMENTS

| | | | | |
|---|---|---|---|---|
| 3,967,102 | A * | 6/1976 | McCown ...................... | 708/322 |
| 5,159,711 | A * | 10/1992 | Ma et al. ...................... | 455/307 |
| 6,724,840 | B1 * | 4/2004 | Osofsky et al. ............... | 375/346 |
| 7,116,958 | B1 * | 10/2006 | Brown et al. ................. | 455/266 |
| 2002/0176522 | A1 * | 11/2002 | Fan ................................ | 375/340 |
| 2003/0017817 | A1 * | 1/2003 | Cowley ......................... | 455/323 |
| 2005/0190867 | A1 * | 9/2005 | Sobchak et al. .............. | 375/346 |
| 2006/0078038 | A1 * | 4/2006 | McCorkle ..................... | 375/130 |
| 2006/0104197 | A1 * | 5/2006 | Proctor et al. ................ | 370/209 |
| 2006/0141973 | A1 * | 6/2006 | Behrens et al. ............... | 455/313 |
| 2007/0054629 | A1 * | 3/2007 | Maligeorgos et al. ......... | 455/88 |
| 2007/0105521 | A1 * | 5/2007 | Granata ........................ | 455/296 |
| 2007/0140391 | A1 * | 6/2007 | Pan ............................... | 375/350 |
| 2008/0080597 | A1 * | 4/2008 | Rofougaran ................... | 375/219 |
| 2008/0240301 | A1 * | 10/2008 | Mandal et al. ................ | 375/340 |
| 2008/0242239 | A1 * | 10/2008 | Wilson et al. .................. | 455/83 |
| 2009/0073949 | A1 * | 3/2009 | Malak et al. .................. | 370/339 |
| 2009/0285135 | A1 * | 11/2009 | Rousu et al. .................. | 370/297 |
| 2010/0118921 | A1 * | 5/2010 | Abdelmonem et al. ...... | 375/148 |
| 2010/0151908 | A1 * | 6/2010 | Skarby et al. .............. | 455/562.1 |
| 2010/0156575 | A1 * | 6/2010 | Shah et al. ...................... | 334/78 |
| 2011/0065408 | A1 * | 3/2011 | Kenington et al. ........... | 455/303 |
| 2011/0109383 | A1 * | 5/2011 | Lan et al. ...................... | 327/574 |
| 2011/0227665 | A1 * | 9/2011 | Wyville ....................... | 333/17.1 |
| 2011/0288823 | A1 * | 11/2011 | Gupta ........................... | 702/189 |
| 2012/0147929 | A1 * | 6/2012 | Malaga et al. ................ | 375/147 |
| 2013/0004180 | A1 * | 1/2013 | Gupta et al. .................. | 398/115 |
| 2013/0099855 | A1 * | 4/2013 | Hahn et al. ................... | 327/553 |
| 2013/0165067 | A1 * | 6/2013 | DeVries et al. ............... | 455/307 |
| 2013/0188528 | A1 * | 7/2013 | Wyville ........................ | 370/278 |

* cited by examiner

*Primary Examiner* — Jung-Jen Liu

(74) *Attorney, Agent, or Firm* — Withrow & Terranova, P.L.L.C.

(57) ABSTRACT

A tunable receiver system uses programmable notch filters to identify available channel pairs for transmitting and receiving data via a femtocell base station. In addition, one of the programmable notch filters may be used to suppress infiltration of the transmit path signal into the receiver path of the receiver device. The other programmable notch filter may be used to suppress a blocker signal identified by the receiver device.

16 Claims, 5 Drawing Sheets

FEMTOCELL TUNABLE RECEIVER FILTERING SYSTEM

FIELD OF THE DISCLOSURE

Embodiments described herein relate to communication and interoperation of wireless devices. In addition, embodiments described herein are further related to interoperability of wireless femtocell base stations.

BACKGROUND

A femtocell is a small cellular base station that is connected to a service provider's network by a broadband network. As an example, a femtocell may connect to a mobile network operator's mobile network, and provides extra coverage in a range of typically 30 to 50 meters for residential femtocells. The power output of a typical femtocell is usually on the order of 20 mW.

The femtocell permits service providers to provide service coverage in small localized areas such as a residence or a small business. A femtocell typically supports 2 to 4 active mobile phones in a residential setting, and 8 to 16 active mobile phones in enterprise settings. A femtocell allows service providers to extend service coverage indoors, especially where access would otherwise be limited or unavailable.

In contrast, a macro-cell is a cell within a mobile phone network and provides radio coverage served by a power cellular base station tower over a relatively large geographic area. The antennas for macro-cells are mounted on ground-based masts, rooftops and other existing structures, at a height that provides a clear view over the surrounding buildings and terrain. Macro-cell base stations have power outputs of typically tens of watts. The possible drawback to femtocells is that there can be interference with other nearby femtocells and macro-cells.

Accordingly, there is a need for a femtocell system that can suppress blocking signals and other interference signals from impacting the reception of transmitted data between a femtocell base station and a receiver device.

SUMMARY

The embodiments described in the detailed description relate to using programmable notch filters to identify available channel pairs for transmitting and receiving data via a femtocell base station. In addition, one of the programmable notch filters may be used to suppress infiltration of the transmit path signal into the receiver path of the receiver device. The other programmable notch filter may be used to suppress a blocker signal identified by the receiver device.

As an exemplary embodiment, a femtocell base station includes a first programmable notch filter having a first filter input and a first filter output, where the first filter output is configured to couple to a low noise amplifier of a transceiver. The femtocell base station further includes a second programmable notch filter having a second filter input and a second filter output, wherein the second filter output is in communication with the first filter input, and the second filter input is in communication with a duplexer. A controller may be coupled to the first programmable notch filter and the second programmable notch filter. The controller may be used to configure the first programmable notch filter and the second programmable notch filter to identify an available channel pair and a blocker signal within a receiver bandwidth. The controller may then program, after identification of the available channel pair and the blocker signal, a notch of the first programmable notch filter to equal a transmitter frequency of the available channel pair and the second programmable notch filter to notch out the blocker signal.

As another embodiment, a tunable receiver system includes a duplexer having a duplexer output, a low noise amplifier having a low noise amplifier input, a first programmable notch filter, and a second programmable notch filter. The first programmable notch filter and the second programmable notch filter may be coupled in series to form a tunable receiver system, wherein the first programmable notch filter is in communication with the low noise amplifier input, and wherein the second programmable notch filter is in communication with the duplexer output. In addition, the tunable receiver system may further include a controller coupled to the first programmable notch filter and the second programmable notch filter. The controller may be configured to configure the first programmable notch filter and the second programmable notch filter to act as a receiver band pass filter. Using the receiver band pass filter, the controller may be further configured to determine an available channel pair based upon an output of the receiver band pass filter, wherein the available channel pair includes a receiver channel and a transmitter channel, and identify a blocker signal based upon the available channel pair. After determining an available receiver channel, the controller may be configured to program the second programmable notch filter to notch out a transmitter frequency of the transmitter channel and to program the first programmable notch filter to notch out the blocker signal.

Still another exemplary embodiment includes a method for configuring a receiver path of a femtocell base station. The method includes programming a first programmable notch filter and a second programmable notch filter to act as a band pass filter. The method further includes identifying, based upon an output of the band pass filter, an available channel pair, where the available channel pair includes a receiver channel and a transmission channel. The method may include identifying a blocking signal relative to the available channel pair. The method may further include programming the first programmable notch filter to filter out the transmit channel, and programming the second programmable notch filter to filter out the blocking signal.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
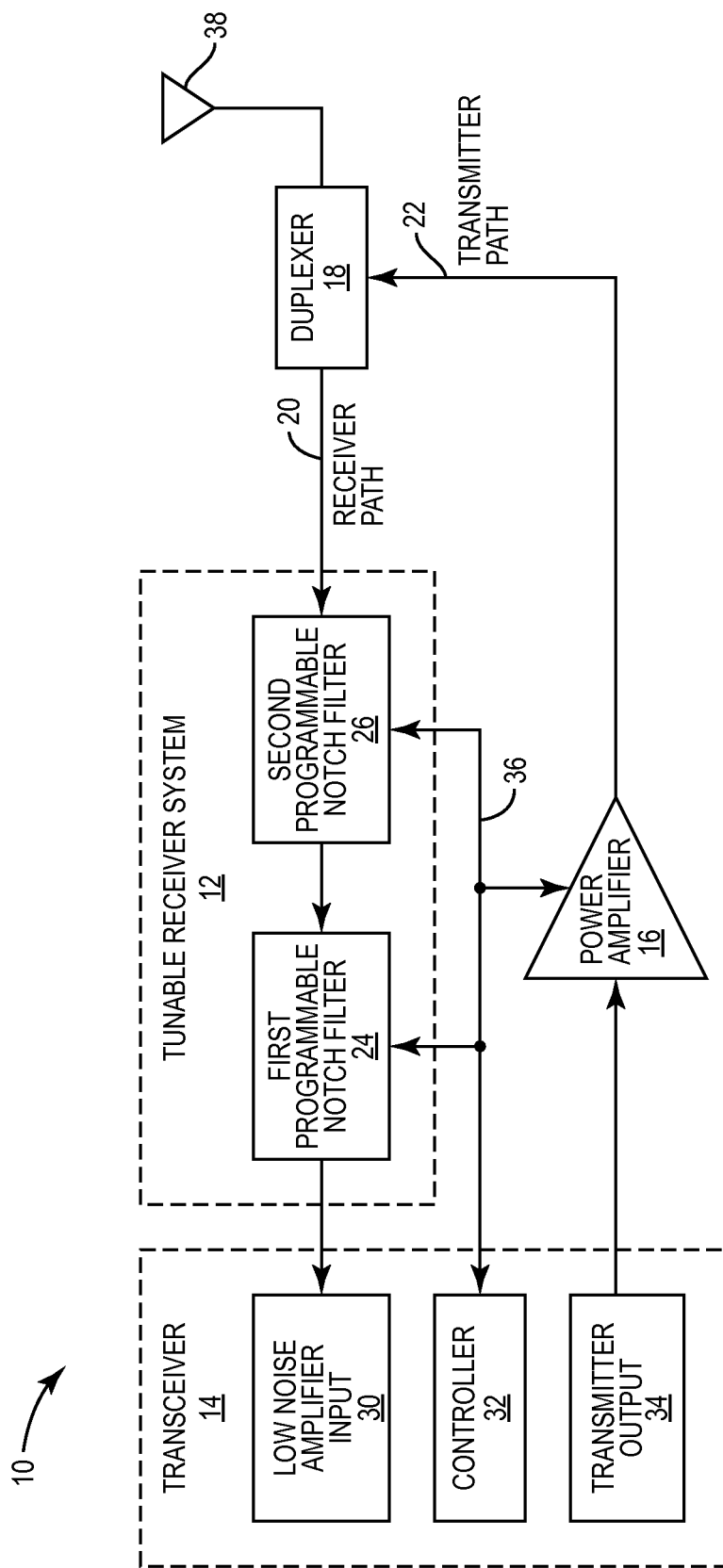
FIG. 1 depicts a block diagram of an embodiment of the femtocell base station having a tunable receiver system.

FIG. 1 depicts a block diagram of an embodiment of the femtocell base station 10 having a tunable receiver system 12, a transceiver 14, a power amplifier 16 and a duplexer 18. The femtocell base station 10 includes a receiver path 20 and a transmitter path 22.

The tunable receiver system 12 includes a first programmable notch filter 24 coupled to a second programmable notch filter 26. The input of the first programmable notch filter 24 is coupled to the output of the second programmable notch filter 26.

A transceiver 14 includes a low noise amplifier input 30, a controller 32, and a transmitter output 34. The controller 32 is coupled to the first programmable notch filter 24, the second programmable notch filter 26 and the power amplifier 16 via a control bus 36. The low noise amplifier input 30 is configured to receive the output of the first programmable notch filter 24. The transmitter output 34 is configured to couple to an input of a power amplifier 16. The controller 32 may be configured to program or govern the operation of the first programmable notch filter 24 and the second programmable notch filter 26.

The first node of the duplexer 18 is coupled to the input of the second programmable notch filter 26. The baseband signal of the receiver path 20 is provided to the input of the second programmable notch filter 26. The second node of the duplexer 18 is coupled to the output of the power amplifier 16. The third node of the duplexer 18 is coupled to an antenna 38.

The tunable receiver system 12 functions in two modes. In the first mode of operation, receiver monitoring mode, the tunable receiver system 12 is configured to act as a band pass filter. In the second mode of operation, receiver operational mode, the tunable receiver system 12 is configured to filter out the signal transmitted by the power amplifier 16 and a blocker signal received via the antenna 38.

Figure 2:
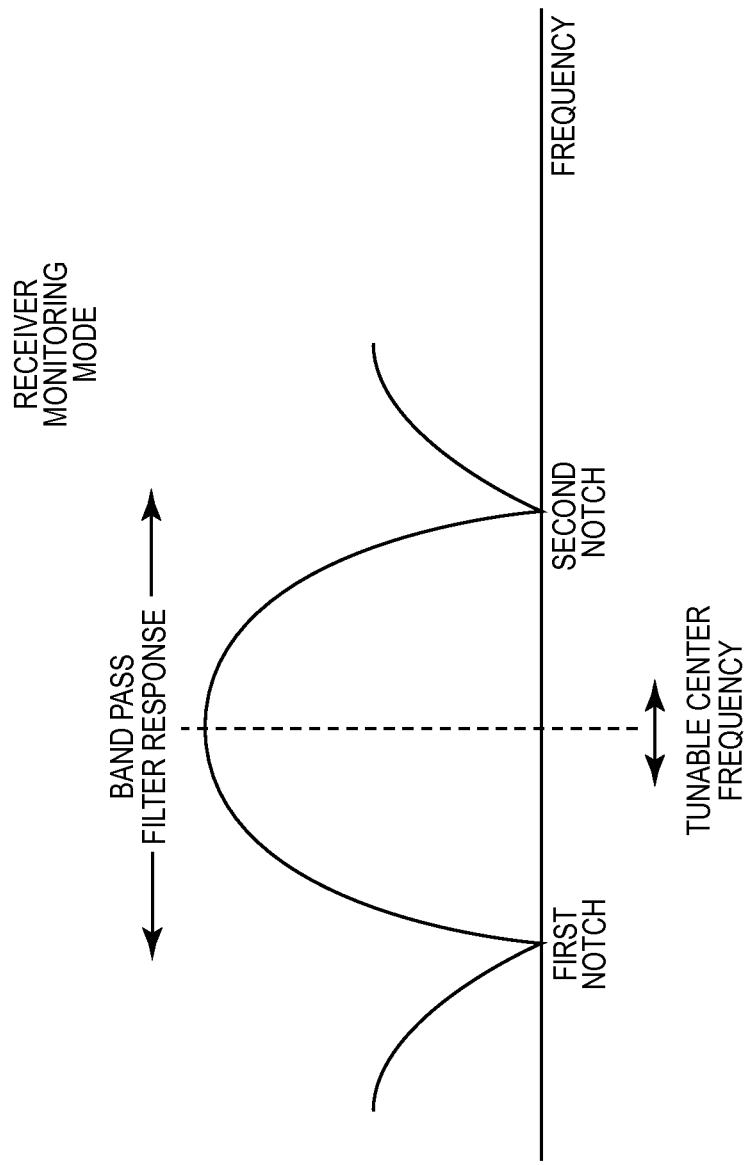
FIG. 2 depicts the band pass response of the tunable receiver system when the femtocell base station is operating in a monitoring mode to determine an available channel pair and location of blocking signals.

As illustrated in FIG. 2, when in the receiver monitoring mode of operation, the frequency response of the first programmable notch filter 24 and the second programmable notch filter 26 may be combined to form a band pass filter response. While in the receiver monitoring mode of operation, the controller 32 of the transceiver 14 monitors the potential receiver channels to determine whether one of the receiver channels is available. In addition, the controller 32 identifies potential blocker signals that could disrupt the normal operation of the femtocell base station 10. As an example, the femtocell base station 10 may determine the channel pairs already being used nearby. A channel pair may include a transmitter channel and an associated receiver channel. Based upon the availability of channel pairs and the location of identified blocker signals, the controller 32 identifies an available channel pair for use by the femtocell base station 10. A channel pair may include a receiver band and an associated transmitter band. In addition, the controller 32 identifies a blocker signal to be suppressed.

Figure 3:
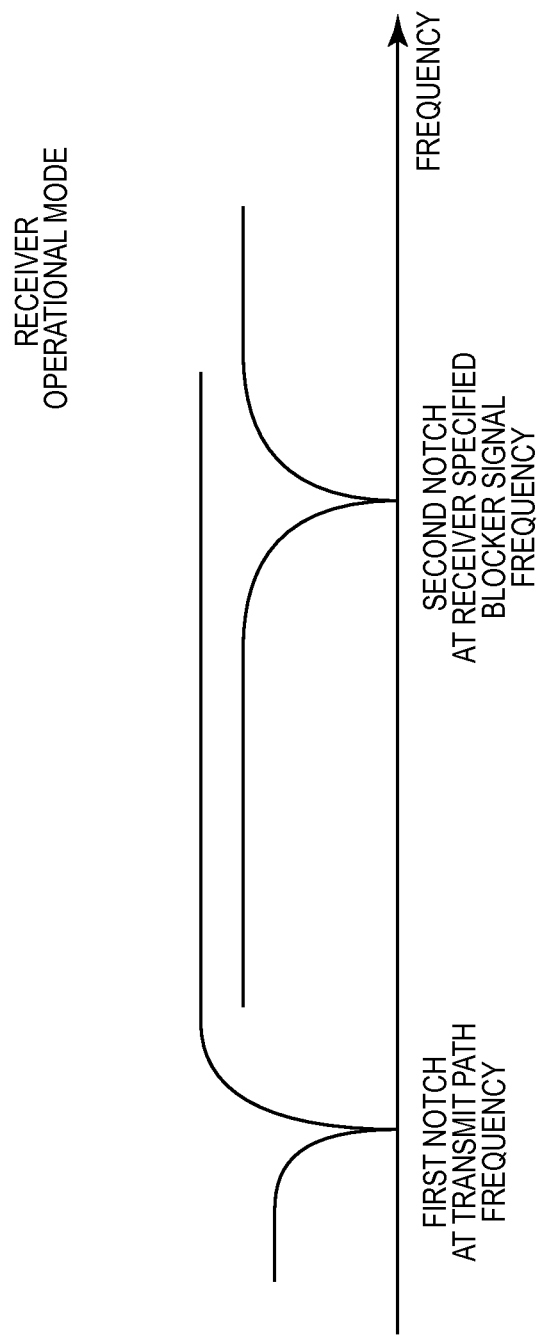
FIG. 3 depicts the band pass response of the tunable receiver system when the femtocell base station is operating in an operational mode to send and receive information.

As illustrated in FIG. 3, when in the operational mode, the frequency response of the first programmable notch filter 24 is reprogrammed to provide a notch located at the transmitter frequency of the available channel pair. The first programmable notch filter 24 reduces the likelihood that the transmitter path 22 will be fed back through the duplexer and interfere with operation of the receiver path. The second programmable notch filter 26 is reprogrammed to form a notch located at the frequency of a blocker signal to be suppressed. Accordingly, the second programmable notch filter 26 provides for some rejection of the blocker signal.

Although not shown, the first programmable notch filter 24 and the second programmable notch filter 26 may include an inductor and a capacitor. In some embodiments, the capacitor may be a variable capacitor such as a capacitor array or a varactor.

Figure 4:
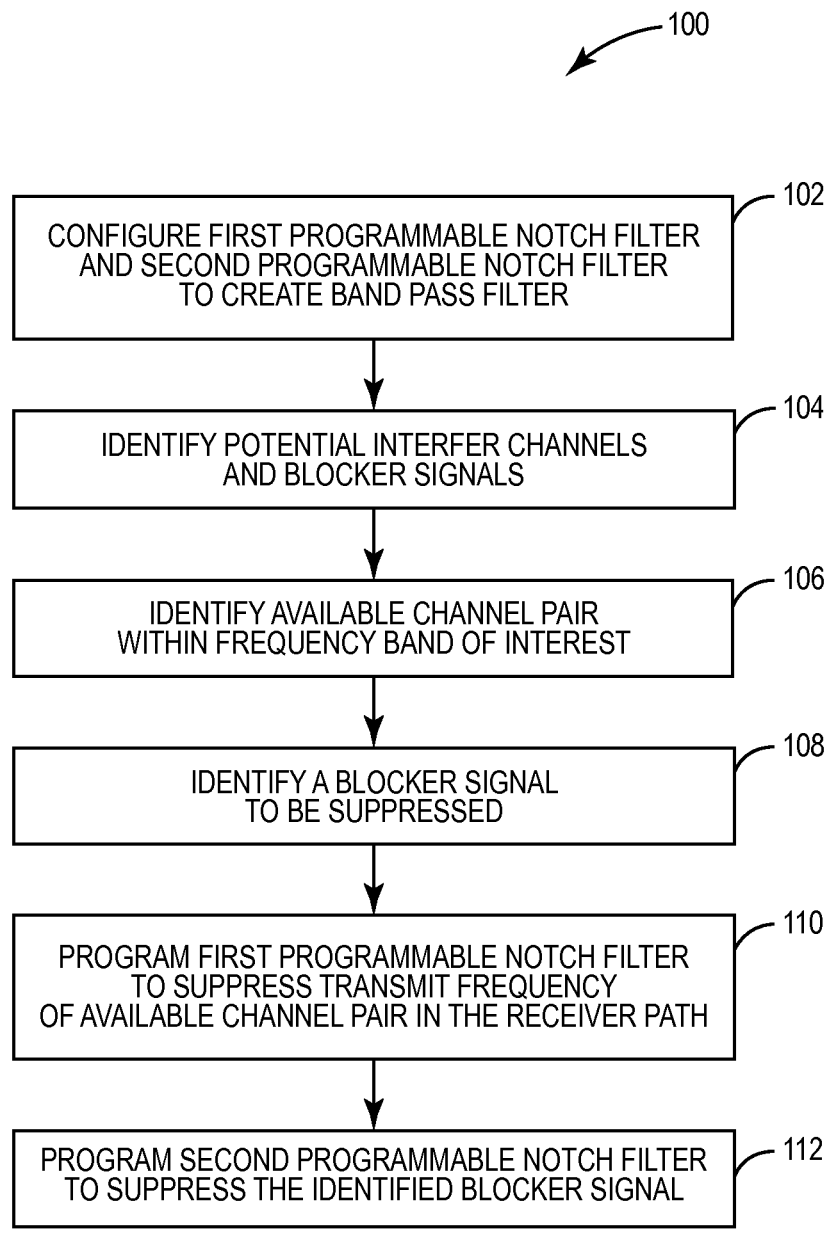
FIG. 4 depicts a flow diagram of an embodiment of the femtocell base station.

FIG. 4 depicts an exemplary process 100 controlling the tunable receiver system 12. The controller 32 configures the first programmable notch filter 24 and the second programmable notch filter 26 to create a band pass filter, (Step 102). Thereafter, the controller 32 scans a frequency band of interest to identify potential interferer channels and identify blocker signals, (Step 104). Based upon the output of the tunable receiver system 12, the controller 32 identifies an available channel pair that may be used by the femtocell base station 10 within the frequency band of interest, (Step 106). Also, the controller 32 may identify a blocker signal to be suppressed, (Step 108). The controller 32 may identify the blocker signal to be filtered based upon an overall magnitude or a relative magnitude of the blocker signal. As an example, the blocker signal may be selected based upon relative magnitude when the blocker signal is located close to the operational frequencies of the selected or available channel pair. Alternatively, the controller 32 may select the blocker signal to be filtered based upon a maximum magnitude of the blocker signal.

Thereafter, the controller 32 may program the first programmable notch filter 24 to suppress the transmitter frequency of the available channel pair in the receiver path 20, (Step 110). The controller 32 may program the second programmable notch filter 26 to suppress the blocking signal in the receiver path 20, (Step 112).

Figure 5:
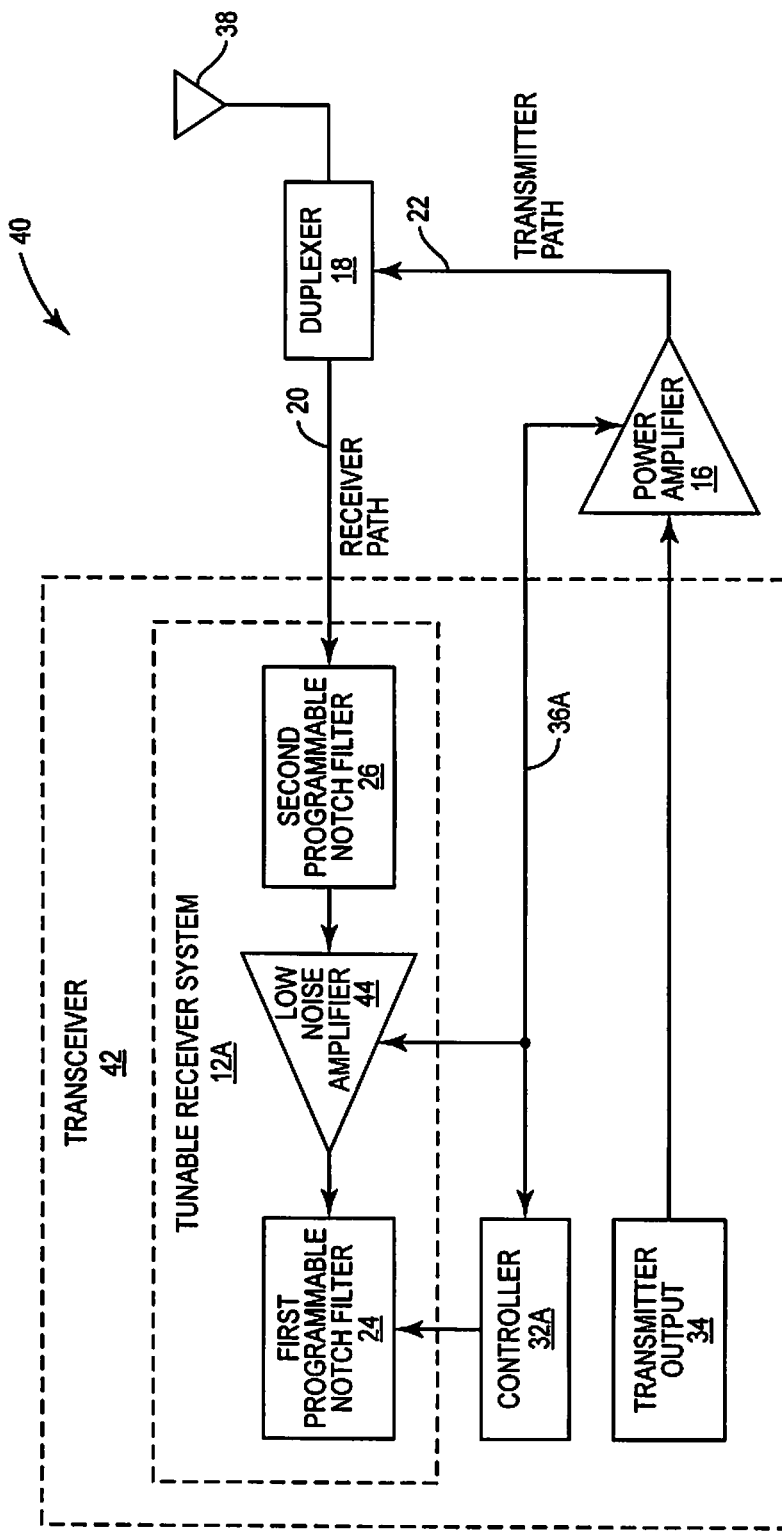
FIG. 5 depicts a block diagram of another embodiment of the femtocell base station having a tunable receiver system.

FIG. 5 depicts a block diagram of an alternative embodiment of a femtocell base station 40, where the first programmable notch filter 24 and the second programmable notch filter 26 form a tunable receiver system 12A that includes a low noise amplifier 44. The first programmable notch filter 24, the second programmable notch filter 26, and the low noise amplifier 44 may be incorporated into a transceiver 42. Although not shown, in some embodiments, only one of the first programmable notch filter 24 and the second programmable notch filter 26 is incorporated into the transceiver 42.

Unlike the femtocell base station 10 depicted in FIG. 1, the femtocell base station 40 places a low noise amplifier 44 between the first programmable notch filter 24 and the second programmable notch filter 26. Accordingly, the output of the second programmable notch filter 26 may be electrically coupled to the input of the low noise amplifier 44. The output of the low noise amplifier may be electrically coupled to the input of the first programmable notch filter 24. Otherwise, the controller 32A includes a control bus 36A coupled to the first programmable notch filter 24, the second programmable notch filter 26, the noise amplifier 44, and the power amplifier 16. The controller 32A may be used to configure and control the first programmable notch filter 24 and the second notch filter 36 in a similar fashion as described above relative to the femtocell base station depicted in FIGS. 1 and 4.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices. As an example, a combination of computing devices may include a combination of a DSP and a microprocessor, a plurality of microprocessors, one or more microprocessors in conjunction with a DSP core, or any other such configuration.

The embodiments disclosed herein may be embodied in hardware and in instructions that are stored in memory, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that a processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. For example, the operational steps illustrated in the flow chart diagrams may be subject to numerous different modifications. Information, data, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will recognize improvements and modifications to the embodiments of the present disclosure. All such improvements and modifications are considered within the scope of the concepts disclosed herein and the claims that follow.

What is claimed is:

1. A femtocell base station comprising:
a first programmable notch filter having a first filter input and a first filter output, wherein the first filter output is configured to couple to a low noise amplifier of a transceiver;
a second programmable notch filter having a second filter input and a second filter output, wherein the second filter output is in communication with the first filter input of the first programmable notch filter, and the second filter input is in communication with a duplexer;
a controller coupled to the first programmable notch filter and the second programmable notch filter, wherein the controller is configured:
to program the first programmable notch filter and the second programmable notch filter to act as a receiver band pass filter;
to determine an available channel pair based upon an output of the receiver band pass filter, wherein the available channel pair includes a receiver channel and a transmitter channel;
to identify a blocker signal based upon the available channel pair;
to program a notch of the first programmable notch filter to equal a transmitter frequency of the available channel pair; and
to program the second programmable notch filter to notch out the blocker signal.

2. The femtocell base station of claim 1 wherein the blocker signal is a maximum signal strength blocker signal.

3. The femtocell base station of claim 1 wherein the available channel pair includes a receiver channel and a transmitter channel.

4. A tunable receiver system comprising:
a duplexer including a duplexer output;
a low noise amplifier including a low noise amplifier input;
a first programmable notch filter in communications with a second programmable notch filter to form a tunable receiver system, wherein the first programmable notch filter is in communication with the low noise amplifier input, and wherein the second programmable notch filter is in communication with the duplexer output;
a controller coupled to the first programmable notch filter and the second programmable notch filter, the controller configured:
to program the first programmable notch filter and the second programmable notch filter to act as a receiver band pass filter;
to determine an available channel pair based upon an output of the receiver band pass filter, wherein the available channel pair includes a receiver channel and a transmitter channel;
to identify a blocker signal based upon the available channel pair;
to program the second programmable notch filter to notch out a transmitter frequency of the transmitter channel; and
to program the first programmable notch filter to notch out the blocker signal.

5. The tunable receiver system of claim 4 wherein the first programmable notch filter includes a varactor.

6. The tunable receiver system of claim 4 wherein the second programmable notch filter includes a varactor.

7. The tunable receiver system of claim 4 wherein the first programmable notch filter includes a digitally programmable capacitor array.

8. The tunable receiver system of claim 4 wherein the second programmable notch filter includes a digitally programmable capacitor array.

9. A method for configuring a receiver path of a femtocell base station comprising:
programming a first programmable notch filter and a second programmable notch filter to act as a receiver band pass filter;
determining, based upon an output of the receiver band pass filter, an available channel pair, where the available channel pair includes a receiver channel and a transmitter channel;
identifying a blocker signal relative to the available channel pair;
programming the first programmable notch filter to equal a transmitter frequency of the available channel pair; and
programming the second programmable notch filter to notch out the blocker signal.

10. The method for configuring the receiver path of the femtocell base station of claim 9 wherein there are more than one blocker signal, the method for configuring the receiver path of the femtocell base station further comprising:
  determining which of the more than one blocker signals is a strongest blocker signal based upon the available channel pair.

11. The method for configuring the receiver path of the femtocell base station of claim 10 wherein each of the more than one blocker signals are below a threshold, programming the second programmable notch filter to filter out the blocker signal further comprises programming the second programmable notch filter to filter out the more than one blocker signals closest to the receiver channel.

12. A tunable receiver system comprising:
  a first programmable notch filter having an input and an output;
  a second programmable notch filter having an input and an output;
  a low noise amplifier including:
    a low noise amplifier input electrically coupled to the output of the second programmable notch filter; and
    a low noise amplifier output electrically coupled to the input of the first programmable notch filter, wherein the second programmable notch filter is configured to receive a baseband signal;
  a controller in communication with the first programmable notch filter and the second programmable notch filter, the controller configured:
    to program the first programmable notch filter and the second programmable notch filter to act as a receiver band pass filter;
    to determine an available channel pair based upon an output of the receiver band pass filter, wherein the available channel pair includes a receiver channel and a transmitter channel;
    to identify a blocker signal based upon the available channel pair;
    to program, after determining the available receiver channel, the second programmable notch filter to notch out a transmitter frequency of the transmitter channel; and
    to program the first programmable notch filter to notch out the blocker signal.

13. The tunable receiver system of claim 12 wherein the first programmable notch filter includes a digitally programmable capacitor array.

14. The tunable receiver system of claim 12 wherein the second programmable notch filter includes a digitally programmable capacitor array.

15. The femtocell base station of claim 1 wherein the first and second programmable notch filters are distinct from the duplexer.

16. The femtocell base station of claim 1 wherein the second filter output couples to the first filter input without intervening elements.

* * * * *